United States Patent

Soulant, Jr.

[15] 3,648,161
[45] Mar. 7, 1972

[54] MAGNETIC LINEARITY TENSIDUCTOR FOR MEASURING TENSION IN A RUNNING LINE

[72] Inventor: Herman A. Soulant, Jr., Rockville, Md.
[73] Assignee: The United States of America as represented by the Secretary of the Navy
[22] Filed: Oct. 29, 1969
[21] Appl. No.: 872,266

[52] U.S. Cl. ............................................................ 324/34
[51] Int. Cl. ...................................................... G01r 33/00
[58] Field of Search ................... 324/34, 34 ST; 73/88.5, 143

[56] References Cited

UNITED STATES PATENTS

| | | | |
|---|---|---|---|
| 3,432,747 | 3/1969 | Quittner | 324/34 |
| 2,005,011 | 6/1935 | Specht | 324/34 |
| 2,007,772 | 7/1935 | Sams et al. | 324/34 |

FOREIGN PATENTS OR APPLICATIONS 120,670   8/1958   U.S.S.R. .............................. 324/34 ST

*Primary Examiner*—Alfred E. Smith
*Attorney*—R. S. Sciascia, Q. E. Hodges and R. F. Sandler

[57] ABSTRACT

A system for measuring stress, especially a high degree of stress, in a magnetically conductive member which provides for the generation of a magnetic field about the member and a pickup mechanism which is magnetically coupled to the member. The output of the pickup mechanism is passed through a filter rejecting all but the third harmonic of the field-generating drive signal frequency. The third harmonic is related to the stress in the member since a varying stress in the member similarly varies the nonlinearity of the B–H curve of the member. This in turn varies the amount of the third harmonic signal present at the filter output.

7 Claims, 1 Drawing Figure

Patented March 7, 1972
3,648,161
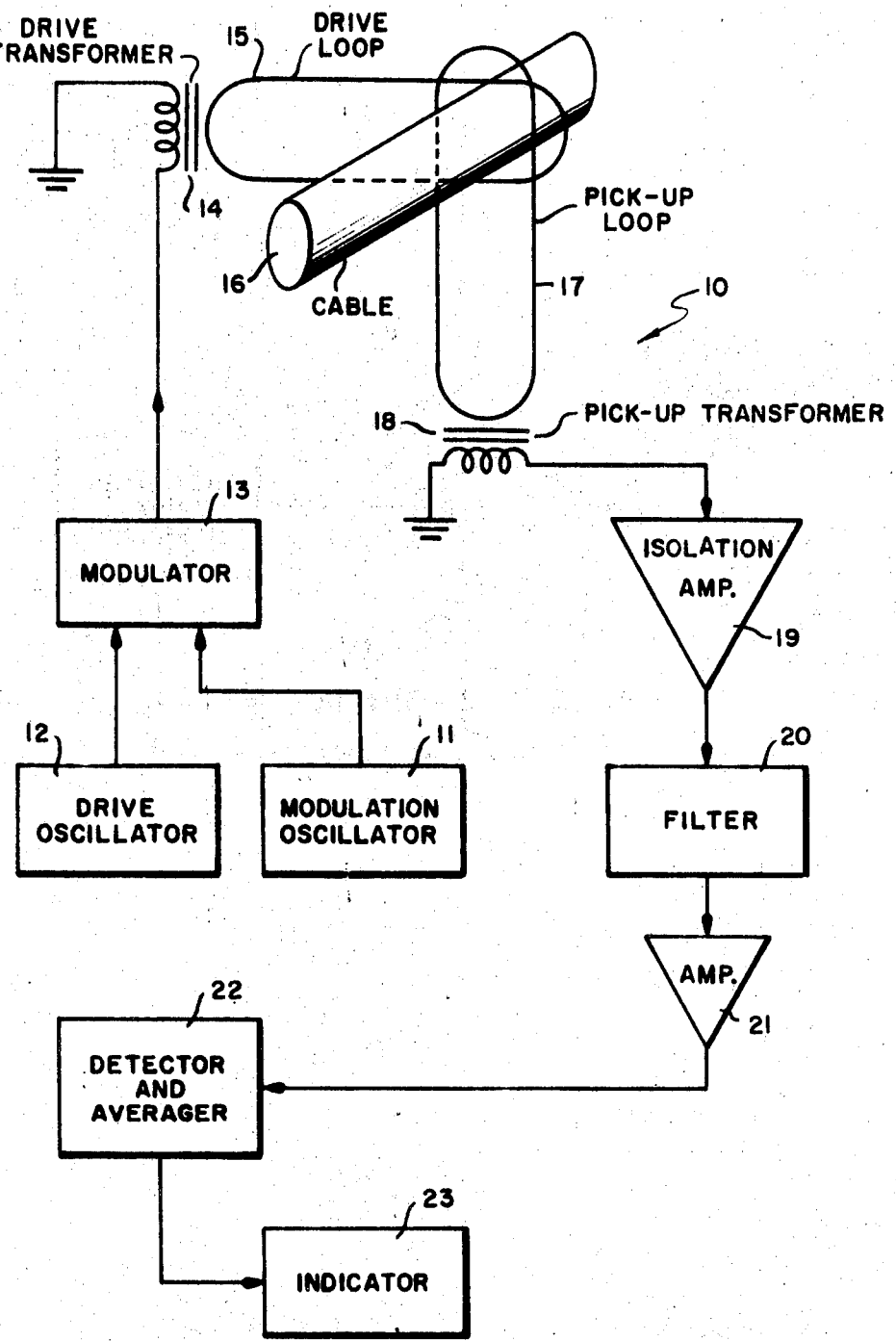
INVENTOR.
HERMAN A. SOULANT, Jr.
BY
ATTORNEYS

મ3,648,161

MAGNETIC LINEARITY TENSIDUCTOR FOR MEASURING TENSION IN A RUNNING LINE

The invention described herein may be manufactured and used by or for the Government of the United States of America for governmental purposes without the payment of any royalties thereon or therefor.

BACKGROUND OF THE INVENTION

This invention relates to devices for measuring stress in a magnetically conductive member and, more specifically, measurement of tension in metallic cables.

Devices of this type are especially useful for making measurements on structural members subjected to variable stress which may exceed the capacity of the member. Continuous monitoring of the stress condition of the member will permit prevention of overload and destruction of the member.

Those prior art devices which do not require any physical attachment to the member under test and, therefore, are suitable for making measurements on a running cable, have required the generation of a magnetic field about the member and a pickup mechanism which is magnetically coupled to the member. Such a device is shown in an application for a U.S. Pat. Ser. No. 693,396, filed on Dec. 26, 1967. The device which is the subject of that application determines the tension in a cable by allowing the measurement of changes in magnetic conductivity as a function of the stress induced in the cable. Such prior art systems, while useful for measuring small changes in members subjected to low stress levels, have not been highly accurate, have not displayed a large dynamic range and have not had the capability of making measurements under high stress conditions.

As discussed above, there are outstanding requirements for stress-measuring systems which are accurate, have good dynamic range, and especially for a system useful for making measurements on material subjected to a high degree of stress. Such requirements have proved difficult to achieve in the past. The present invention teaches a system capable of meeting these requirements.

Accordingly, it is an object of the present invention to provide a new and improved system for measuring stress in a magnetically conductive member.

Another object of the invention is to provide a system for measuring tension in a running cable of magnetic material.

A further object of the invention is to provide a stress-measuring device capable of making measurements under high-stress conditions.

Still another object of the invention is to provide a highly accurate stress-measuring device.

A still further object of the invention is to provide a stress-measuring device with a broad dynamic range.

Other objects and many of the attendant advantages, as well as the exact nature of the invention, will be readily apparent to those skilled in the art from the consideration of the following disclosure of the invention.

SUMMARY OF THE INVENTION

The present invention accomplishes the above-cited objects by providing a system which is suitable for measuring stress without resorting to use of information relating to the magnetic conductivity or permeability of the member under test.

More specifically, there is provided a housing which may be assembled around a member, such as a cable, the housing having a large enough opening to allow the member free passage through the housing. The housing is provided with two coils, each of which surrounds the cable. One of the coils generates an alternating current magnetic field and the other acts as a pickup means for determining the magnetic field induced therein. The cable provides a magnetic path linking the coils. As the stress in the cable changes, the magnetic conduction, as shown by its B-H curve, will change similarly. In effect, what is provided is a variable permeability core in a transformer with a single turn primary and a single turn secondary. With a fixed alternating drive voltage on the primary, the variation in induced voltage in the secondary will be related to the variation in permeability of the core.

While detection of the foregoing variable permeability in the member is adequate for low-level stress situations, it leaves a great deal to be desired when testing under high-stress situations since the permeability of the various materials usually under test tends to become relatively constant with saturation as a high-stress situation is approached. It has been discovered, however, that the nonlinearity of the B-H characteristic does not become constant under high stress, but continues to change. Since the third harmonic of the fundamental alternating drive voltage is representative of the B-H characteristic, the induced voltage of the secondary pickup coil may be filtered so that only the third harmonic passes and it is this filtered voltage that will be used as indicative of stress.

The system, therefore, requires only elementary electronic and mechanical components and can be installed at any convenient point on a cable or other member and is both inexpensive and portable.

BRIEF DESCRIPTION OF THE DRAWING

The sole FIGURE is a block diagram of a stress-measuring system illustrating an embodiment of the invention.

DESCRIPTION OF THE PREFERRED EMBODIMENT

Referring now to the FIGURE, there is shown a block diagram of a stress-measuring system 10 constructed according to the teachings of this invention. The block diagram illustrates the functional position of the major components employed.

Shown are a modulation oscillator 11 and a drive oscillator 12 being fed into a modulator 13. The drive oscillator frequency may be about 300 c.p.s. and is modulated by, for example, 10 c.p.s. by the modulation oscillator 11 when appearing at the output of the modulator 13. The only purpose of the modulation is to remove or erase the residual magnetism or "magnetic memory" of the material being tested. With the residual magnetism or magnetic memory of the material periodically erased by the modulation, the material is maintained in a magnetically virgin state characterized by the absence of residual or remnant magnetism. In this magnetically virgin state, the B-H curve is found to be symmetrical about the zero point (i.e., the intersection of the B and H axes) and the alternating magnetizing force produced by the drive oscillator produces a cyclical flux field varying equally above and below the H-axis. This modulated 300 c.p.s. signal is then used to drive the drive transformer 14 whose secondary is the drive loop 15, i.e., field-generating coil, which creates the field about the member under test shown herein as cable 16. Pickup loop 17, also surrounding the cable 16, will receive an induced voltage because of the generated field.

Drive loop 15 and pickup loop 17 actually constitute a single turn primary and a single turn secondary of a transformer with cable 16 acting as a core. With a given level of signal impressed on the drive loop 15, the level of induced voltage on the pickup loop 17 will vary as the cable 16 undergoes a variation in stress because the permeability will vary with stress. However, this is true only until its B-H curve shows saturation.

Pickup loop 17 forms the primary of pickup transformer 18 which feeds the isolation amplifier 19 whose purpose is simply to prevent the low-impedance filter 20 from loading down the received signal on the pickup loop 17. Filter 20 preferably is a narrow band-pass filter designed to pass 900 c.p.s., plus or minus a few cycles, the third harmonic of the fundamental 300 c.p.s. drive signal frequency.

Use of the third harmonic rather than the fundamental frequency is a result of the recognition of the occurrence of the following principles in such a testing system as disclosed. It appears that all magnetic materials with substantial permeability display the characteristics that (1) their associated B-H curves will rotate towards the B or the H axis with a variation in stress; (2) that the B-H curves will have two saturation levels at some relatively high degree of field intensity; and (3) that the B-H curves will be nonlinear between the two saturation levels. Prior art systems that measure average permeability change with stress variation can only be useful until the stress level rotates the B-H curve to a position where the saturation points are within the level of the generated field. When this level is reached, the signal out will remain relatively constant with increasing stress. As the B-H curve approaches either of the asymptotes, saturation may occur on receiving even extremely low field intensity and, if more than one level of drive were used, continual adjustments and correlation would be required. Such a process, whether automatic or mental, would introduce prohibitive complexity and opportunity for error.

In the present invention, stress in the magnetic material rotates the nonlinear B-H curve of the material, symmetrically distorting it, and thereby producing a third harmonic signal proportional to the stress. The change in the third harmonic voltage, which is related to and effectively proportional to the change in stress, is independent of B-H curve saturation and experiences no saturation point or other limitation of its own and it can be used as an indication of stress at any point prior to reaching the yield point of the member under test.

The filter output, consisting only of the 900 c.p.s. third harmonic, is amplified by amplifier 21, rectified and smoothed by the detector and averager 22 comprised of a series diode followed by a shunt R-C network and then displayed by indicator 23. What will be displayed at indicator 23 is an envelope representing the detected peaks of the third harmonic present in the system. The amplitude of the envelope will represent the relative stress levels on the member under test and the time rate of change represents the frequency of variation of the stress applied.

What has been disclosed is a general application stress-measuring system, especially useful in measuring tension in a highly stressed running line, displaying many improved characteristics. The disclosed system is capable of measuring high stress levels, is very accurate, removes magnetic memory and eliminates critical phase and amplitude adjustment needed to buck out residual signal necessary for measurements in systems depending on the permeability technique, i.e., those systems sensing only the fundamental drive frequency. All this has been achieved without any substantial system complexity. It should be understood, of course, that the foregoing disclosure relates only to a preferred embodiment of the invention and that numerous modifications may be made therein.

What is claimed is:

1. In a system for measuring stress in a member exhibiting a nonlinear permeability characteristic having:
    a source of time varying current of a given frequency;
    a modulator connected to said source;
    said modulator frequency being lower than said given frequency, for removing residual magnetism from said member;
    field-generating means for receiving said time varying current and creating a time varying field about the member;
    field-sensing means about the member for generating a signal in response to said time varying field;
    signal-receiving means connected to said sensing means for receiving said signal; and
    said signal-receiving means presenting a relatively high series impedance to that portion of said signal substantially corresponding to said source frequency while presenting a substantially low series impedance to that portion of said signal substantially corresponding to the third harmonic of said source frequency.

2. In the stress-measuring system of claim 1, said field-generating means and said field-sensing means each consisting of at least a single turn coil about the member.

3. In the stress-measuring system of claim 1, the signal-receiving means including a filter with a bandwidth of a few cycles.

4. In the stress-measuring system of claim 3, said filter output being connected to a detector and an averager, said detector rectifying said filter output and said averager smoothing said detector output.

5. The system for measuring stress in a magnetic material comprising:
    means for inducing a cyclically varying magnetic flux field within the material;
    means for generating a signal in response to said varying flux field;
    means connected to said generating means for detecting the third harmonic component of said signal;
    said means for inducing said magnetic flux field within the material includes a modulator for modulating said cyclically varying magnetic flux field; and
    said modulating component removing residual magnetism from said member twice during each modulating cycle.

6. The system of claim 5, wherein said modulated varying magnetic flux field for removing said residual magnetism maintains the B-H curve of said material symmetrical about the zero point.

7. The system of claim 6, wherein said means for detecting said third harmonic signal comprises a filter, a detector and an averager;
    said filter having its input connected to said means for generating said signal and having a bandwidth substantially that of the third harmonic of the frequency of the cyclically varying magnetic flux field;
    said filter having its output connected to said detector and said averager; and
    said averager smoothing said detector output.

* * * * *